United States Patent

McCampbell et al.

[11] Patent Number: 5,988,603
[45] Date of Patent: Nov. 23, 1999

[54] LEVEL MAINTENANCE IN CYCLONE CONTRACTORS

[75] Inventors: David P. McCampbell, Kansas City, Mo.; Carroll E. Ball, San Diego, Calif.

[73] Assignee: Midwest Research Institute, Kansas City, Mich.

[21] Appl. No.: 09/038,862

[22] Filed: Mar. 11, 1998

Related U.S. Application Data

[60] Provisional application No. 60/040,682, Mar. 13, 1997.
[51] Int. Cl.[6] ........................................................ B01F 3/02
[52] U.S. Cl. ............................................. 261/76; 261/79.2
[58] Field of Search ....................... 261/76, 79.2; 96/245, 96/246, 256, 261; 73/863.21; 436/177

[56] References Cited

U.S. PATENT DOCUMENTS

| | | | |
|---|---|---|---|
| 2,943,705 | 7/1960 | Staunt | 261/76 |
| 4,117,714 | 10/1978 | Goodson et al. | |
| 4,634,560 | 1/1987 | Eckert | 261/76 |
| 5,011,517 | 4/1991 | Cage et al. | |
| 5,679,580 | 10/1997 | Ball et al. | |
| 5,861,316 | 1/1999 | Cage et al. | |

*Primary Examiner*—David A. Simmons
*Assistant Examiner*—Robert A. Hopkins
*Attorney, Agent, or Firm*—Chase & Yakimo, L.C.

[57] ABSTRACT

The operating level of the liquid in a cyclone contactor is maintained without the need for an external sensor and a control valve. A pressure balancing connection communicates the contactor with a chamber from which the liquid for the contactor is supplied. The liquid level is maintained by equalizing the pressure at (or slightly below) the instability point of the contactor and the pressure head in the liquid supply chamber.

6 Claims, 1 Drawing Sheet

LEVEL MAINTENANCE IN CYCLONE CONTRACTORS

CROSS-REFERENCE

This application claims the benefit of the prior filed copending provisional application, Ser. No. 60/040,682, filed Mar. 13, 1997.

BACKGROUND OF THE INVENTION

This invention relates to improvements in cyclone contactors of the type used in sample evaporators and emission monitoring systems and, in particular, to a means for maintaining the proper liquid level in the contactor receptacle without the need for an external sensor.

Cyclone contactors are employed as concentrators in emission monitoring systems as shown and described, for example, in U.S. Pat. Nos. 4,117,714 and 5,011,517. They are also utilized as the key component in laboratory analysis systems that rapidly evaporate samples under analysis in order to concentrate the analyte, as shown and described in U.S. Pat. No. 5,679,580. In these and other applications the cyclone concentrator typically comprises a cylindrical receptacle having an elongated inlet slit therein arranged to introduce air or other gas under pressure into the cylindrical chamber in an tangential direction where it swirls in the receptacle in intimate contact with a liquid introduced through a separate inlet port. An external sensor has been employed to maintain the liquid at a level below an instability point relative to the length of the gas inlet slit in order to prevent the liquid from being expelled from the receptacle by the vacuum that draws the air or other gas into the chamber for the swirling action.

Several types of sensors have been utilized to monitor the liquid level inside the contactor and open a valve as necessary to admit fluid. These include sensors of the conductive, capacitive and optical type, each of which has drawbacks that limit its usefulness. For example, a conductive sensor has probes that are inserted through the wall of the contactor receptacle, thus eliminating any variability in the level sensing; a capacitive sensor can be mounted externally in such a way to allow level variability, but it cannot sense collection fluids that are non-conductive; and a through-beam optical sensor is subject to interference by degradation of and deposits on the inner surface of the receptacle.

In addition, the valves controlled by these sensors are digital, i.e., open or closed. The hysteresis necessary in the valve control allows fluid into the chamber in small bursts that take the liquid level higher than the sensing position before the valve is closed. Thus, the liquid level in the contactor must be held lower than the instability point to ensure that no liquid is withdrawn by the negative pressure.

SUMMARY OF THE INVENTION

It is, therefore, the primary object of the present invention to provide a contactor of the type described above which does not require a sensor and control valve to maintain the proper liquid level therewithin.

It is also an important object of the invention to provide such a contactor in which a higher liquid level relative to the inlet slit may be maintained.

Another important object is to provide a contactor as aforesaid in which the liquid level is maintained at or slightly below the instability point of the contactor through the use of a pressure balancing connection that communicates the contactor with a chamber from which the liquid for the contactor is supplied.

More particularly, in the present invention to be described hereinbelow, the liquid level is maintained by equalizing the pressure at (or slightly below) the instability point of the contactor and the pressure head in a liquid supply reservoir. The pressure balancing thus obtained eliminates the need for any sensors, valves and ancillary electronics to control the introduction of fluid into the contactor. It also allows the operating level to be maintained at the instability point since the rate of fluid introduction is proportional to the pressure differential.

DETAILED DESCRIPTION

Figure 1:
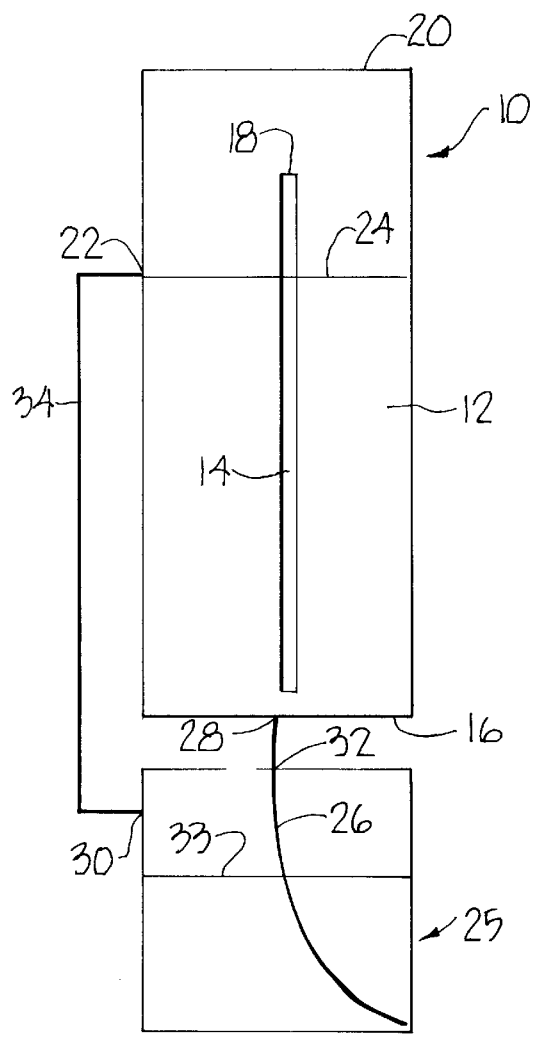
FIG. 1 is a diagrammatic view of a contactor apparatus including a cylindrical receptacle into which a gas under pressure and a liquid are introduced, and a liquid supply chamber in fluid communication with the receptacle.

Referring to FIG. 1, the contactor of the present invention is of the general type disclosed in the aforesaid patents and comprises an upright cylindrical receptacle 10 made from any suitable material such as, for example, clear acrylic plastic. The receptacle 10 presents a relatively thin, cylindrical wall 12 having an elongated, vertical inlet slit 14 therein extending from near the base 16 thereof to a termination 18 spaced from the upper end 20 of the receptacle 10. A port 22 through the wall 12 is located at, or slightly above, the instability point of the contactor. The maximum liquid level permitted by the present invention is illustrated at 24, substantially at the bottom edge of the port 22. On a typical acrylic contactor with a 1.75 inch inside diameter and a 4-inch long, 0.070 wide slit, this point is 0.75 inches below the top 18 of the slit 14. This instability point, and corresponding location of port 22 will vary with the size of the contactor and the slit dimensions.

Figure 2:
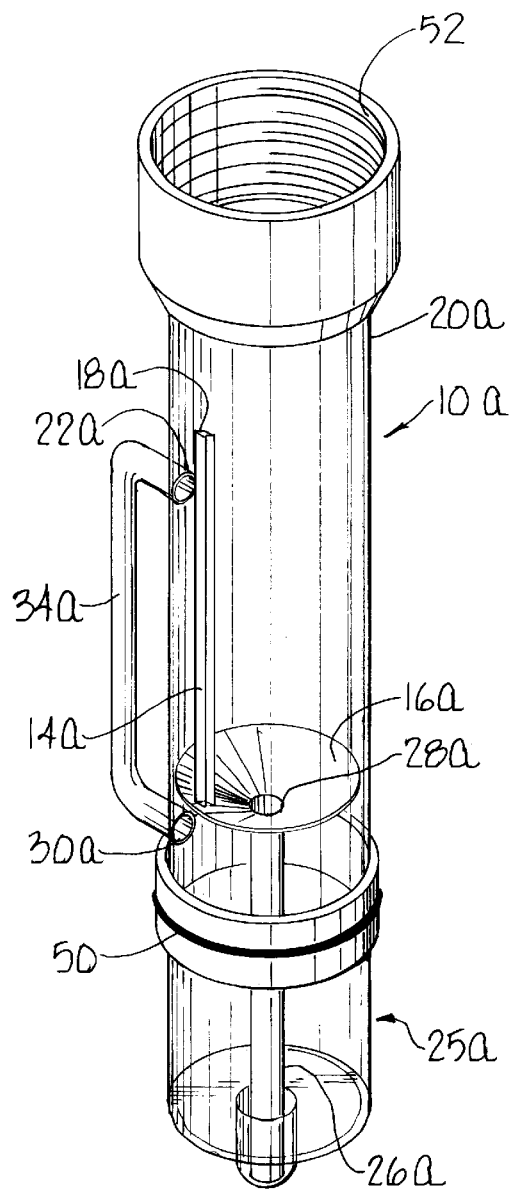
FIG. 2 is a perspective view of an integrated contactor and liquid supply reservoir for an evaporation system.

A liquid supply chamber for the contactor can be either a separate reservoir 25, such as a bottle or other vessel, connected via tubing 26 to a port 28 in the base 16 of the receptacle 10, or an integrated chamber at the base of the contactor as shown in FIG. 2 and described below. In either case, the liquid supply chamber 25 is air-tight and, in FIG. 1, has a side port 30 for pressure balancing and a port 32 at the top of the vessel through which the tubing 26 passes for liquid intake into the receptacle 10. The side port 30 should be higher than the liquid level 33 inside the chamber. The liquid intake port 32 can be either at the bottom of the liquid supply chamber 25 or at the top thereof as shown with tubing 26 extending beneath the liquid level 33 to the bottom of the chamber. A pressure balancing tube 34 extends from the side port 22 of the receptacle 10 to the side port 30 of the liquid supply chamber 25.

Operation commences by initiating the air flow through the inlet slit 14 of the contactor by the action of a vacuum pump (not shown) having an intake communicating with the upper end or outlet 20 of the receptacle 10. With negative pressure thus applied, the pressure inside the liquid supply chamber 25 is greater than inside the receptacle 10 thereby forcing liquid into the contactor via supply line 26. As the liquid level rises in receptacle 10 and approaches the instability point, the pressure differential between the contactor receptacle and the liquid supply chamber drops, eventually reaching zero, and halting the flow of liquid into the contactor. Eventually, enough liquid in the contactor will evaporate to create a pressure differential, allowing liquid to again flow into the contactor. This cycle is maintained until the liquid in the chamber 25 is exhausted, at which time the liquid level in the receptacle 10 will drop due to evaporation.

It should be understood that the tubing 26 inside the chamber 25 should be of small inside diameter to restrict the intake rate of liquid into the receptacle 10. This reduces surging which could raise the liquid level inside the contactor above the instability point (port 22) before the pressure can obtain equilibrium.

Referring to FIG. 2, an integrated unit is illustrated which combines the contactor receptacle 10a and liquid supply chamber 25a. Parts having the same function as those described above with respect to FIG. 1 bear the same reference numerals with the addition of the "a" notation. The unit, preferably made of borosilicate glass, is especially designed as a component of a high-speed evaporator which can be used to concentrate an analyte for subsequent analysis. The liquid supply chamber 25a depends from the base 16a of receptacle 10a and includes two threaded tubular parts sealed by an O-ring 50 when the unit is in use, but which can be separated to load the next sample into the chamber. At the upper end 20a of receptacle 10a, an integral, threaded collar 52 provides a threaded connection to allow the unit to be secured to a manifold (not shown) provided in the system so that a vacuum pump may accommodate a number of the units simultaneously.

Maintenance of the level of the liquid sample in the receptacle 10a is accomplished in the same manner as in FIG. 1. The tube 34a allows the air or gas pressure inside receptacle 10a and inside chamber 25a to balance, thus regulating the intake of liquid sample into the contactor and maintaining the liquid level until the sample is exhausted from chamber 25a.

Having thus described the invention, what is claimed as new and desired to be secured by Letters Patent is as follows:

1. In a contactor provided with an upright receptacle having a generally cylindrical wall, a generally vertically extending gas inlet slit in said wall having an upper termination, and a gas outlet communicating with said receptacle, said contactor having an instability point below said termination of the slit, the improvement comprising:

a liquid supply chamber;

means communicating said chamber with said receptacle for supplying liquid thereto;

means communicating with said receptacle for flowing gas thereinto through said gas inlet slit and for exhausting the gas from said receptacle through said gas outlet, and pressure balancing connection means communicating with said receptacle below said termination of the gas inlet slit at or below said instability point, and communicating with said chamber above a level of liquid therein, whereby to equalize the pressure in the receptacle and the chamber and maintain the liquid in the receptacle at a desired operating level.

2. The improvement as claimed in claim 1, wherein said pressure balancing connection means includes conduit means interconnecting said receptacle and said chamber.

3. The improvement as claimed in claim 2, wherein said wall has a port substantially at said operating level and said chamber has a port above the liquid level therein, said conduit means communicating with said ports.

4. The improvement as claimed in claim 1, wherein said receptacle has an upper end, said termination of the slit being spaced from said end.

5. The improvement as claimed in claim 1, wherein said chamber is below said receptacle.

6. The improvement as claimed in claim 1, wherein said receptacle has a base, said chamber depending from said base and having means removably securing the chamber thereto, said liquid supplying means including an intake line extending downwardly from said base into said chamber.

* * * * *